UNITED STATES PATENT OFFICE.

THOMAS MORAN AND DAVID MOSHER, OF SAN FRANCISCO, CALIFORNIA; SAID MOSHER ASSIGNOR, BY DIRECT AND MESNE ASSIGNMENTS, OF THREE-EIGHTHS TO MATILDA DEIDESHEIMER, OF SAN FRANCISCO, CALIFORNIA, AND ONE-EIGHTH TO CASSIUS E. GILLETTE, OF PHILADELPHIA, PENNSYLVANIA.

MARINE PAINT.

1,072,485.      Specification of Letters Patent.      Patented Sept. 9, 1913.

No Drawing.      Application filed March 14, 1912.   Serial No. 683,874.

*To all whom it may concern:*

Be it known that we, THOMAS MORAN and DAVID MOSHER, citizens of the United States, residing in the city and county of San Francisco, in the State of California, have invented a certain new and useful Improvement in Marine Paint, of which the following is a true and exact description.

Our present invention consists of a marine or anti-fouling paint of novel composition adapted to form a good preservative coating for metallic and wooden structures protecting them against the ordinary deteriorating effects of sea water and also possessing poisonous properties highly effective to protect the structure coated against the injurious action or attachment of the teredo, limnoria, the well known barnacle and other marine parasites and fungi.

Heretofore many marine paint compositions have been used or proposed. In these prior paints various poisonous constituents, such as copper and other metallic oxids and compounds of copper and other metals with arsenic have been employed, these poisonous constituents being used with a suitable paint vehicle such as linseed oil, china wood oil, and linseed oil substitutes. An alcohol shellac solution has also been employed as the vehicle in such paints. The poisonous constituents heretofore used in marine paints however have not been sufficiently rapid and constant in their poisonous effects on the organisms to be poisoned, and it is to overcome this objection that we have devised our present invention.

In forming our paint we add to a suitable paint vehicle and suitable metallic paint forming substances such as the oxids of copper and zinc, and the arsenates of copper, zinc and lead, a metallic cyanid such as the cupric or cuprous cyanid of copper, cyanid of mercury or cyanid of zinc, and an additional constituent consisting of a composition prepared by heating together arsenious acid and phenol or creosote under pressure until a thorough chemical interaction has been effected. This compound is particularly effective when used in a marine paint for wooden structures on account of its wood preserving and rot proof qualities.

The copper, zinc and mercury cyanids in our paint react in contact with sea water, the latter being practically a sodium chlorid solution, to form soluble cyanids which are powerfully and immediately poisonous to all marine insect and parasite life, while the chlorids or oxychlorids of copper, zinc or mercury formed are very destructive to marine fungi.

One example of a satisfactory formula for preparing our improved paint is as follows:

| | |
|---|---|
| Copper oxid | 4 to 8 ounces |
| Cyanid of mercury, copper or zinc | 4 to 8 ounces |
| Lead arsenate, dry | 16 to 32 ounces |
| Paris green, dry | 4 to 8 ounces |
| Compound formed from arsenious acid and phenol or creosote | 4 ounces |

To the above we add a sufficient amount of a paint vehicle such as boiled linseed oil, china wood oil or an alcohol shellac solution to make up one gallon of paint. It is to be understood that the foregoing composition may be varied to suit climatic conditions and that some of the metallic constituents may be replaced by others or entirely omitted. In the composition above stated, we may use either red or black copper oxid according to the color desired and we may substitute for the copper oxid, either in whole or in part, certain other metallic oxids, notably oxid of zinc.

Having now described our invention, what we claim as new and desire to secure by Letters Patent is—

In a marine paint composition, the combination with a paint vehicle, of a metallic oxid, a metallic arsenate, a metallic cyanid, and an arsenious acid and phenol compound substantially as described.

THOMAS MORAN.
DAVID MOSHER.

Witnesses:
A. LOWRIE,
FLORA HALL.

Copies of this patent may be obtained for five cents each, by addressing the "Commissioner of Patents, Washington, D. C."